United States Patent [19]

Sebastiano et al.

[11] Patent Number: 5,956,942
[45] Date of Patent: Sep. 28, 1999

[54] METHOD FOR INCREASING THE EFFICIENCY OF A CATALYST IN A DIESEL ENGINE

[75] Inventors: Giovanni Maria Rossi Sebastiano, Torino; Silvio Canale, Collegno, both of Italy

[73] Assignee: C.R.F. Societa Consortile per Azioni, Orbassano, Italy

[21] Appl. No.: 08/776,117

[22] PCT Filed: Jul. 21, 1995

[86] PCT No.: PCT/IT95/00123

§ 371 Date: Jan. 22, 1997

§ 102(e) Date: Jan. 22, 1997

[87] PCT Pub. No.: WO96/03572

PCT Pub. Date: Feb. 8, 1996

[30] Foreign Application Priority Data

Jul. 22, 1994 [IT] Italy .................................. TO94A0607

[51] Int. Cl.⁶ ...................................................... F01N 3/00
[52] U.S. Cl. ................... 60/274; 60/284; 60/285
[58] Field of Search ............... 60/274, 285, 284, 60/301, 303

[56] References Cited

U.S. PATENT DOCUMENTS

| | | | |
|---|---|---|---|
| 4,452,040 | 6/1984 | Kobashi | 60/285 |
| 4,509,327 | 4/1985 | Enga | 60/285 |
| 5,207,058 | 5/1993 | Sasaki et al. | 60/284 |
| 5,343,702 | 9/1994 | Miyajima et al. | 60/285 |
| 5,479,775 | 1/1996 | Kraemer et al. | 60/285 |

FOREIGN PATENT DOCUMENTS 0 070 619  1/1983  European Pat. Off. .

OTHER PUBLICATIONS

Patent Abstract of Japan, vol. 17, No. 558 (M–1493), Oct. 7, 1993 for JP 05–156993.
Patent Abstract of Japan, vol. 18, No. 408 (M–1647), Jul. 29, 1994 for JP 06–117228.
Patent Abstract of Japan, vol. 14, No. 174 (M–0959), Apr. 5, 1990 for JP 02–027177.

*Primary Examiner*—Thomas E. Denion
*Attorney, Agent, or Firm*—Evenson, McKeown, Edwards & Lenahan, P.L.L.C.

[57] ABSTRACT

An injection method applicable to engines featuring a Denox catalyst for reducing the nitric oxide content of exhaust gas. In addition to the main injection phase, the method presents a post-injection phase predominantly performed during the exhaust stroke of the engine, so that the diesel fuel injected does not contribute—or only to a very limited extent—towards combusion, but is supplied directly to the Denox catalyst to increase its efficiency. The method involves no alterations to the injection system, by virtue of post-injection being controlled and optimized by the central unit controlling injection as a whole.

21 Claims, 2 Drawing Sheets

METHOD FOR INCREASING THE EFFICIENCY OF A CATALYST IN A DIESEL ENGINE

TECHNICAL FIELD

The present invention relates to a method of activating a Denox catalyst of a diesel engine with a rail injection system.

BACKGROUND ART

As is known, to safeguard the environment, increasing effort is being made, and in many countries tighter restrictions are being imposed, to control the exhaust of internal combustion engines.

As regards diesel engines in particular, the main problems are due to the presence in the exhaust gas of nitric oxides ($NO_x$) and particulates, as opposed to a very low content of carbon monoxide (CO) and hydrocarbons (HC).

Nitric oxides in particular are currently believed to be a serious source of pollution, by contributing towards and increasing the formation of the so-called "hole" in the ozone layer, and by forming, in the presence of sunlight, aggressive products resulting in various human (eye and skin) ailments and in damage to various types of material.

Various nitric oxide reducing systems are therefore being researched, one of which (EGR system) provides for recirculating the burnt gases, but is insufficient to meet stricter future requirements. Research is also being conducted into so-called DENOX e.g. zeolite, catalysts, which have a reducing effect and assist the reaction between the nitric oxides and other exhaust gas components. Such catalysts, however, are in themselves only moderately effective, so that additional steps must be taken to achieve a really effective reduction in nitric oxide. In particular, the efficiency of the reduction reaction has been found to be greatly improved in the presence of hydrocarbons which participate directly in the catalytic nitric oxide reducing action of the zeolites; and since diesel fuel has been found to be one of the best performing hydrocarbons, a solution has been devised whereby diesel fuel is injected upstream from the Denox catalyst, where it mixes with the exhaust gas to assist the catalyst reaction.

Though it does in fact improve the efficiency of the Denox catalyst, the above solution requires design alterations to the exhaust system to accommodate the injection assembly and connect it to the fuel tank, as well as specific injection control elements involving considerable cost and "ad hoc" setup.

DISCLOSURE OF INVENTION

It is an object of the present invention to provide a straightforward method of improving the efficiency of currently researched Denox catalysts, and which is both easy to implement and requires no alterations to the exhaust system.

According to the present invention, there is provided a method of activating the Denox catalyst of a diesel engine featuring a rail injection system comprising a main injection phase; characterized in that it comprises an auxiliary post-injection phase during at least part of the exhaust stroke of the engine.

BRIEF DESCRIPTION OF DRAWINGS

A preferred, non-limiting embodiment of the present invention will be described by way of example with reference to the accompanying drawings, in which.

BEST MODE FOR CARRYING OUT THE INVENTION

Figure 1:
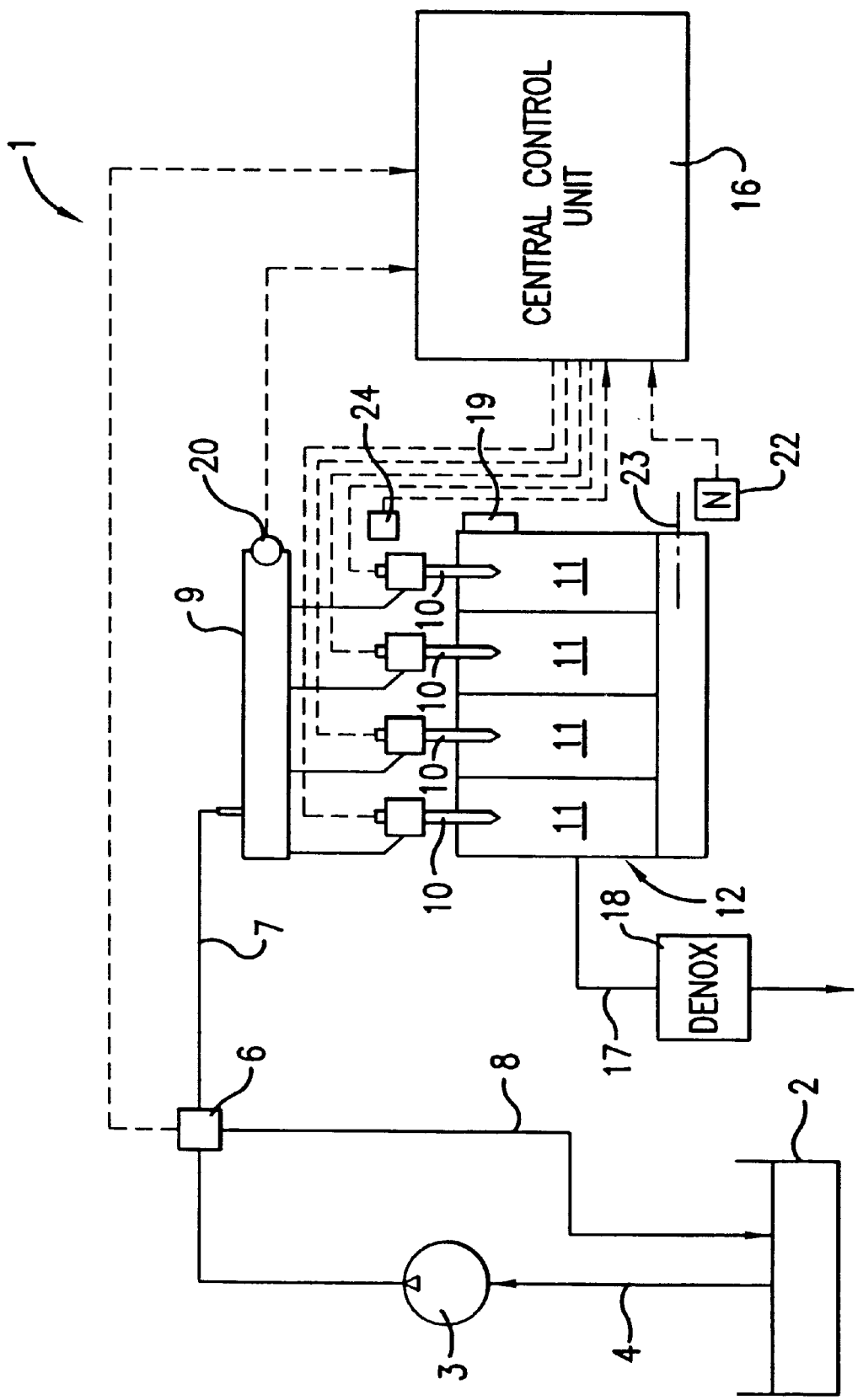
FIG. 1 shows a block diagram of a known diesel engine injection system.

FIG. 1 shows schematically a diesel engine rail injection system 1 of the type to which the present invention relates. Of system 1, only the parts pertinent to the present invention are shown, the fuel conduits being indicated by continuous lines, and the dotted lines indicating the electric lines supplying the control and measured quantity signals.

System 1 comprises:

a fuel (diesel fuel) tank 2:

a high-pressure supply pump 3 connected to tank 2 by a low-pressure conduit 4;

a pressure regulator 6 along a high-pressure line 7;

a low-pressure fuel return conduit 8 between pressure regulator 6 and tank 2;

a high-pressure fuel rail 9 connected to conduit 7 and presenting one or more elements for connection to the injectors;

a number of injectors 10—one for each cylinder 11 of engine 12—connected to rail 9;

a power control unit (central control unit) 16 for governing the system components on the basis of signals from various sensors, memorized maps, and the control strategy implemented;

a combustion product exhaust conduit 17 connected to the exhaust manifold (not shown) of engine 12;

a Denox catalyst 18 along exhaust conduit 17, and possibly presenting a downstream section operating as an oxidizing catalyst;

an intake manifold 19;

a pressure sensor 20 on rail 9;

an engine speed and stroke sensor 22 on the output shaft 23 of the engine; and a cycle sensor 24 on the camshaft (not shown).

Pressure regulator 6, injectors 10, pressure sensor 20, engine speed and stroke sensor 22, and cycle sensor 24 are connected to central unit 16 over electric data and control exchange lines.

According to the present invention, in addition to the main injection phase controlled in the normal way by central unit 16, injection system 1 also provides for post-injecting fuel during the exhaust stroke, to inject hydrocarbons into the exhaust gas and so activate Denox catalyst 18.

Figure 2:
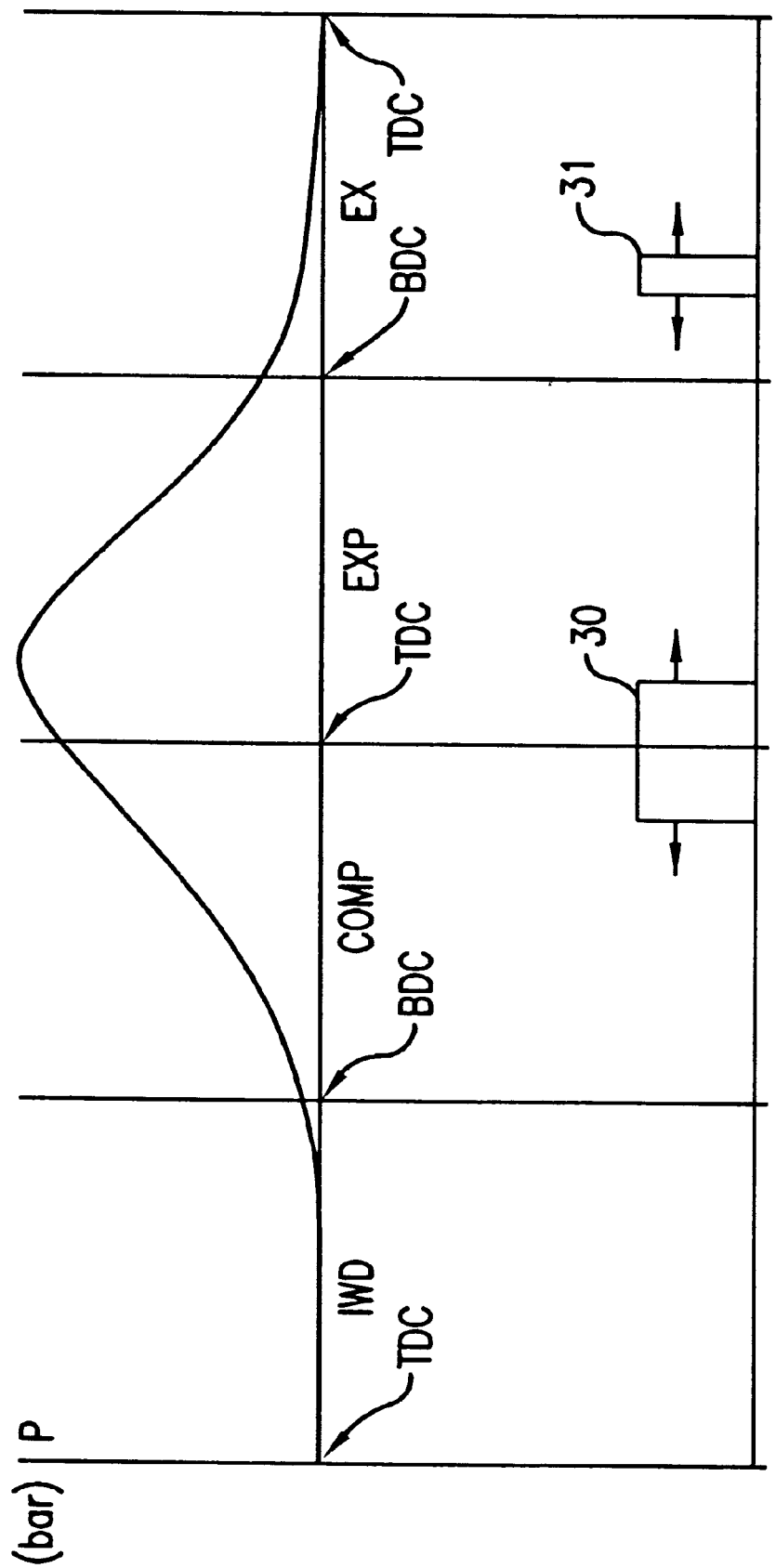
FIG. 2 shows a graph of pressure and injection, in relation to the engine strokes, according to the present invention.

The timing of the auxiliary post-injection phase (which is performed predominantly during the exhaust stroke) is shown schematically in FIG. 2 wherein a first graph shows the pressure at the various strokes of each cylinder; a second graph shows the location of the main injection (30) and post-injection (31) phases; TDC indicates top dead center, BDC bottom dead center, IND the induction stroke, COMP the compression stroke, EXP the expansion stroke, and EX the exhaust stroke.

The conditions for enabling the post-injection phase and the amount of fuel (diesel fuel) injected during the exhaust stroke are determined by central unit 16 as a function of engine speed and load, and also depend on the type of catalyst used. As regards the amount of fuel injected, central unit 16 provides for determining, on the basis of engine speed and load, the approximate amount of nitric oxide in the exhaust gas, and for calibrating the optimum fuel quantity for ensuring efficient operation of the Denox catalyst.

Timing of the post-injection phase is also determined by central unit 16 as a function of engine speed and load, and may be designed to also take into account other operating conditions of the injection and exhaust systems. For example, if a particulate filter (not shown) is provided, post-injection may be effected just prior to the exhaust stroke, so that part of the injected hydrocarbons are burned, increase the temperature of the exhaust gas, and so automatically regenerate the particulate filter. In this case, timing of the post-injection phase is based on a trade-off between the need to regenerate the particulate filter, which requires combustion of the fuel, and the need to enhance the efficiency of the Denox catalyst, which requires unburned fuel.

In the event Denox catalyst 18 presents a downstream section operating as an oxidizing catalyst, any remaining hydrocarbons are eliminated by catalytic combustion as opposed to being discharged into the atmosphere. Alternatively, provision may be made for a separate oxidizing catalyst downstream from Denox catalyst 18.

According to one embodiment of the present invention, as opposed to being performed in all the cylinders at each cycle, post-injection is alternated from one cylinder to another at successive cycles, to enable post-injection of smaller quantities than that which can be handled by the system with the same conditions existing in all the cylinders.

Also, depending on the operating conditions of engine 12, post-injection may be performed in a predetermined number of consecutive or nonconsecutive cycles.

Naturally, alternation of the cylinders, the post-injection enabling sequence in successive cycles, and the number of cycles in which post-injection is to be performed (overall duration) are memorized as a function of engine conditions in a storage element in or associated with central unit 16.

The advantages of the present invention are as follows. In particular, it provides for greatly improving the efficiency of currently researched Denox catalysts with no special devices or alterations to the exhaust system required, but by simply adapting software control and generating appropriate injector control signals. As such, it may be implemented easily and cheaply on existing electronic rail injection system control units, and provides for practical implementation of proposed hydrocarbon injection systems.

Clearly, changes may be made to the method as described and illustrated herein without, however, departing from the scope of the present invention. In particular, and as already stated, the post-injection phase may be advanced or delayed slightly as compared with the example shown, to ensure optimum operating conditions.

Moreover, provision may be made for additional devices or measures for reducing other harmful exhaust gas components, such as a particulate filter and/or oxidizing catalyst.

We claim:

1. A method of activating a Denox catalyst of a diesel engine having a rail injection system, said method comprising the steps of:

injecting diesel fuel during a main injection phase; and injecting diesel fuel during an auxiliary post-injection phase, wherein said auxiliary post-injection phase is carried out in the range between just prior to the exhaust stroke and the top dead center of the engine at the end of the exhaust stroke, at least a portion of said auxiliary post-iniection phase being carried out during the exhaust stroke.

2. A method as claimed in claim 1, wherein said post-injection phase comprises injecting the diesel fuel into the engine cylinders.

3. A method as claimed in claim 1, wherein said post-injection phase is performed alternately in the engine cylinders in successive cycles.

4. A method as claimed in claim 1, further comprising the step of controlling said post-injection phase according to a memorized cycle sequence.

5. A method as claimed in claim 1, further comprising monitoring conditions of the engine, and enabling said post-injection phase upon predetermined values of said conditions being detected.

6. A method as claimed in claim 5, wherein said engine conditions comprise engine speed and load.

7. A method as claimed in claim 1, further comprising detecting conditions of the engine, and calculating the amount of the diesel fuel to be injected as a function of said engine conditions.

8. A method as claimed in claim 2, wherein said post-injection phase is performed alternately in the engine cylinders in successive cycles.

9. A method according to claim 1, wherein said rail injection system is used to inject diesel fuel during both of said main injection phase and said auxiliary post-injection phase.

10. A method according to claim 1, wherein at least a pqrtion of said diesel fuel supplied during said auxiliary post-injection phase does not combust and reaches said Denox catalyst in an unburned state.

11. A method according to claim 10, wherein all of said diesel fuel supplied during said auxiliary post-injection phase does not combust and reaches said Denox catalyst in an unburned state.

12. A method according to claim 1, wherein an entirety of said auxiliary post-injection phase is carried out during the exhaust stroke of the engine.

13. A method of activating a Denox catalyst in an exhaust line downstream of a diesel engine, said diesel engine having at least one cylinder and having a rail injection system which injects a first quantity of diesel fuel into said at least one cylinder during a main injection phase, said method comprising:

injecting a second quantity of diesel fuel into said at least one cylinder during an auxiliary post-injection phase in the range between just prior to the exhaust stroke and the top dead center of the engine at the end of the exhaust stroke such that at least a portion of said second quantity of diesel fuel does not combust and reaches said Denox catalyst in an unburned state, at least a portion of said auxiliary post-injection phase being carried out during the exhaust stroke.

14. A method according to claim 13, wherein said second quantity of diesel fuel is injected via said rail injection system which injects said first quantity of diesel fuel.

15. A method according to claim 13, wherein all of said second quantity of diesel fuel does not combust and reaches said Denox catalyst in an unburned state.

16. A method according to claim 14, wherein all of said second quantity of diesel fuel does not combust and reaches said Denox catalyst in an unburned state.

17. A method according to claim 12, wherein an entirety of said auxiliary post-injection phase is carried out during the exhaust stroke of the engine.

18. A method according to claim 13, wherein said post-injection phase is controlled according to a memorized cycle sequence.

19. A method according to claim 13, wherein conditions of the engine are detected, said post-injection phase being enabled when predetermined values of said engine conditions are detected.

20. A method according to claim 19, wherein said engine conditions comprise engine speed and load.

21. A method according to claim 20, wherein said second quantity of fuel is determined as a function of said engine conditions.

* * * * *